April 6, 1954 C. A. LATIMER 2,674,108
AUTOMATIC PRESSURE RELEASE TOOL
Original Filed Dec. 15, 1943 5 Sheets-Sheet 5
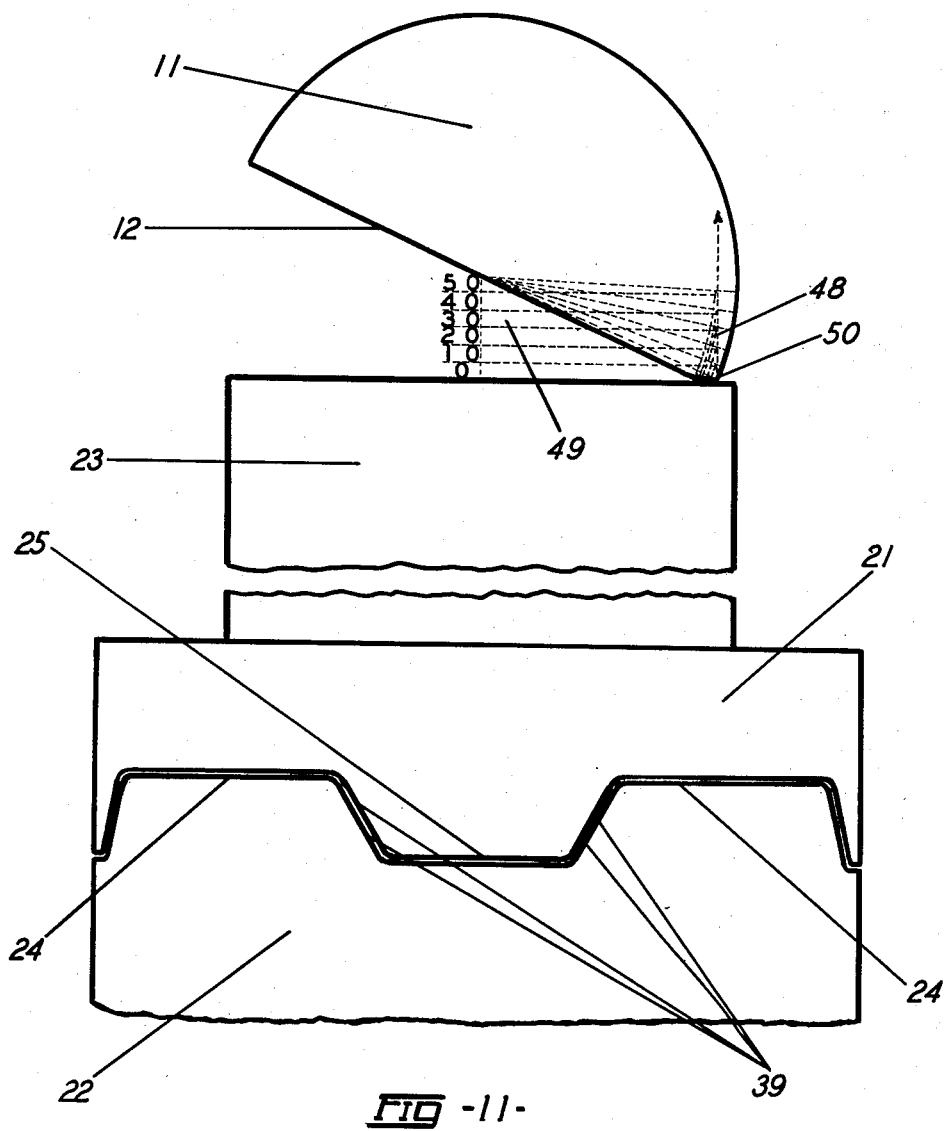
FIG -11-
INVENTOR.
Charles A. Latimer
BY Patented Apr. 6, 1954

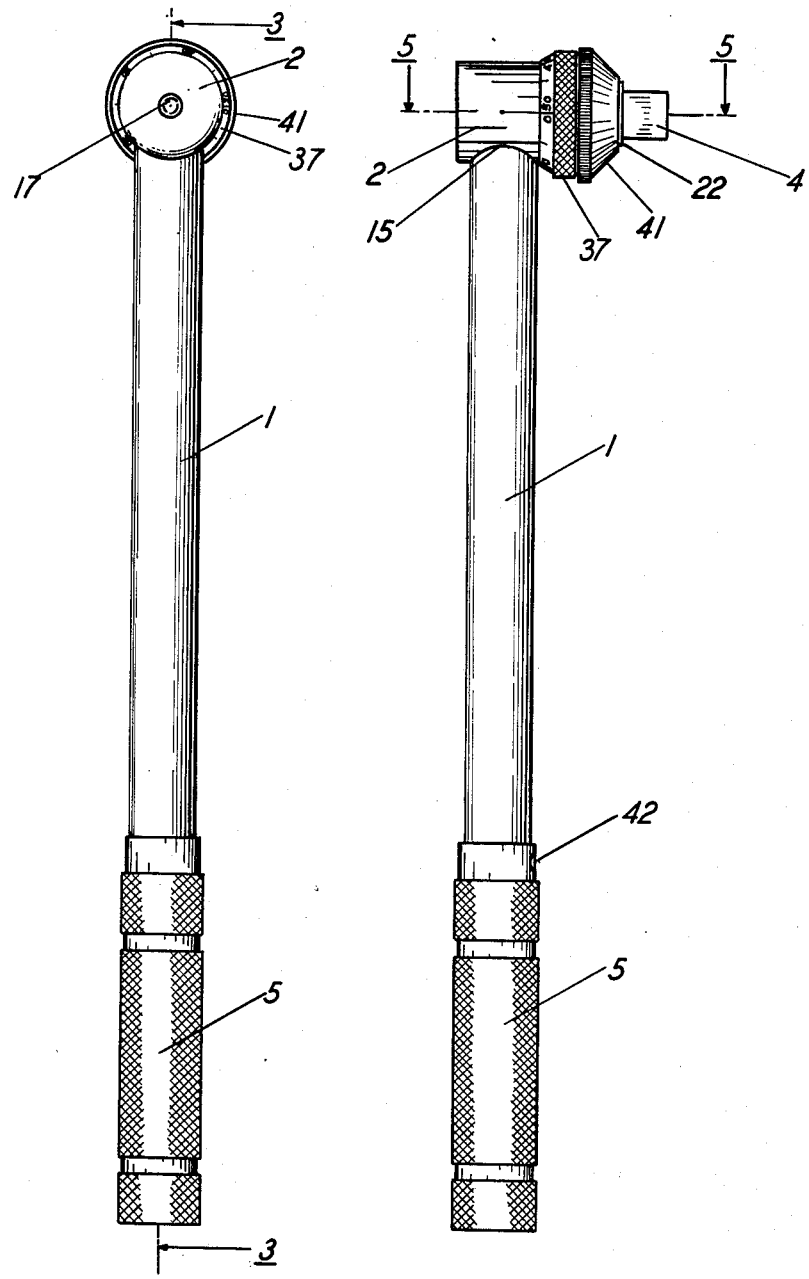

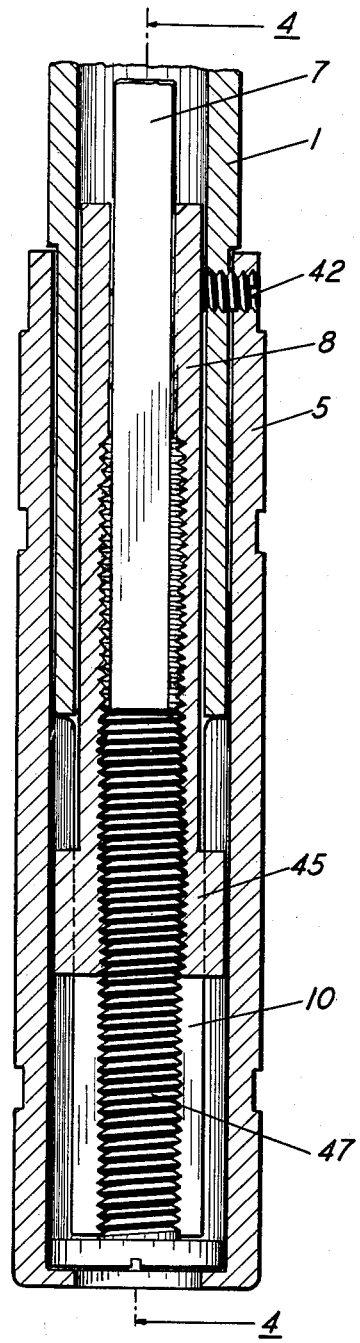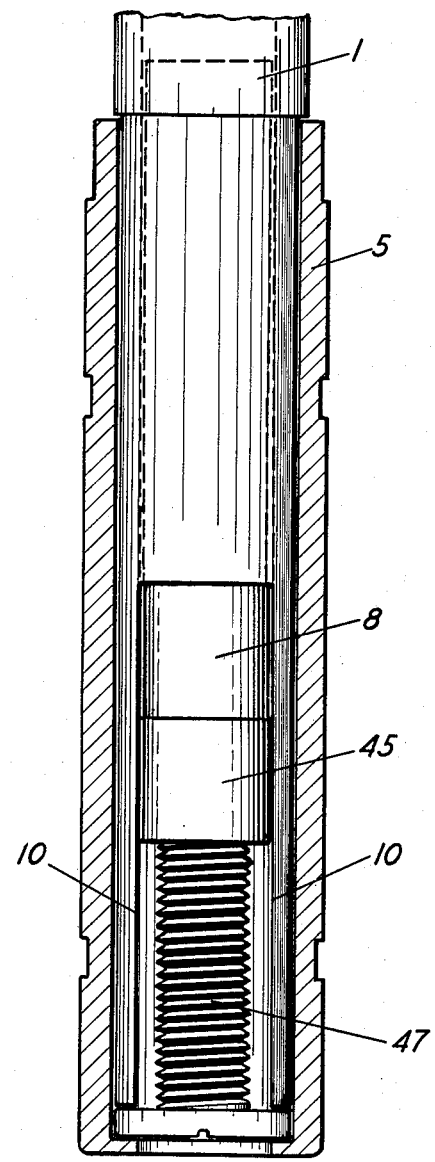
Fig -3-
Fig -4-

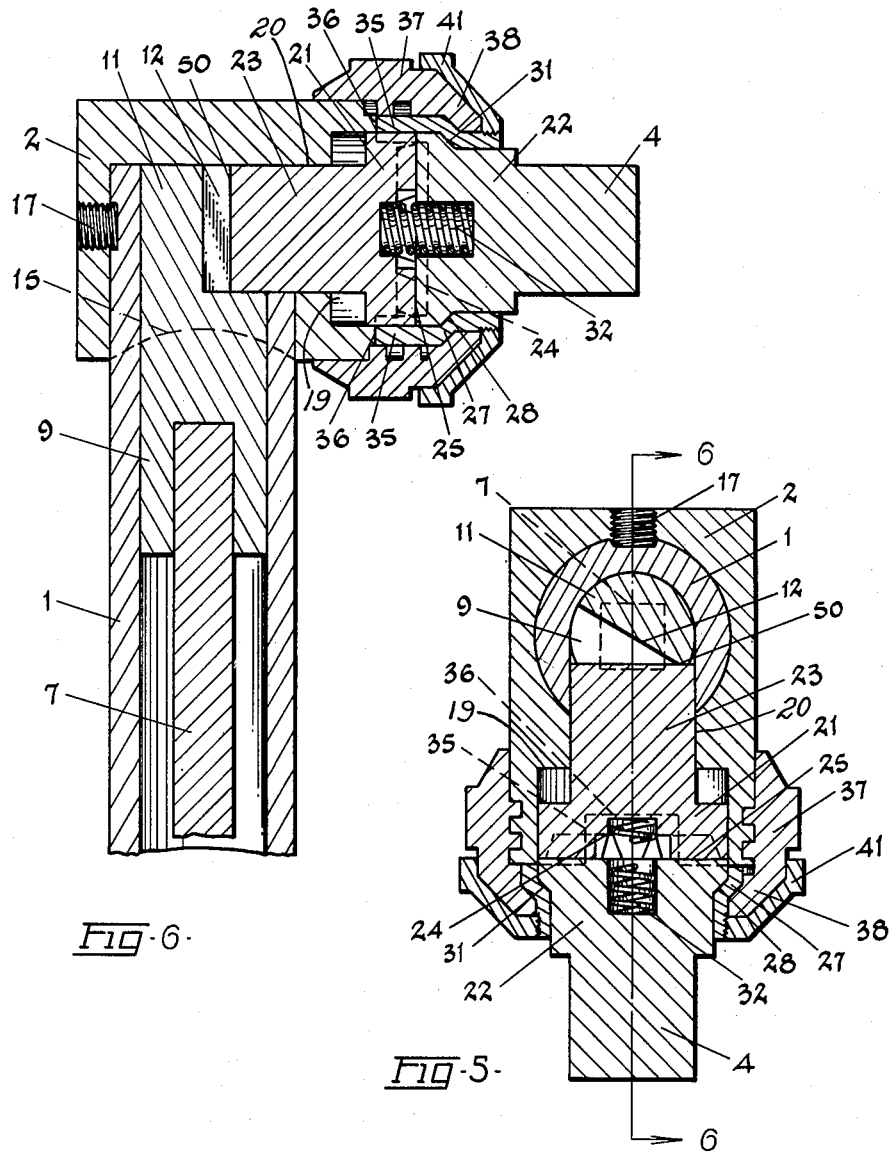

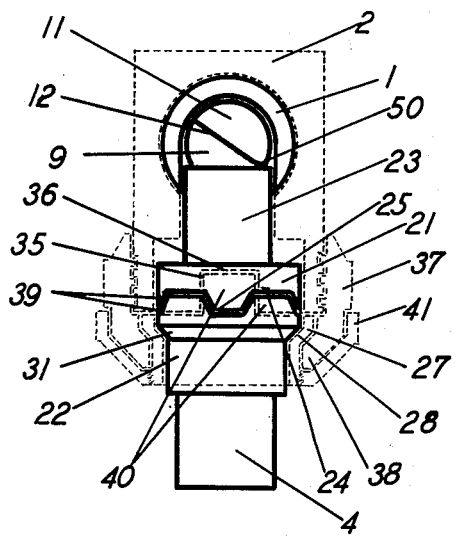
FIG - 7 -
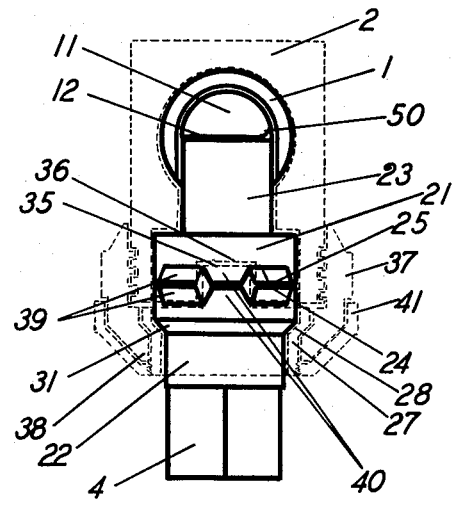
FIG - 8 -
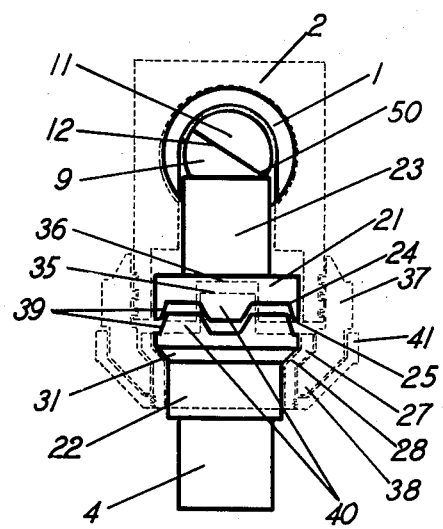
FIG - 9 -
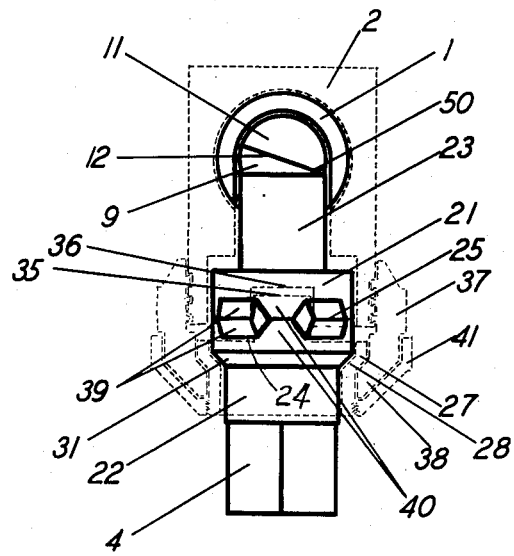
FIG - 10 -

2,674,108

UNITED STATES PATENT OFFICE 2,674,108

AUTOMATIC PRESSURE RELEASE TOOL

Charles A. Latimer, Toledo, Ohio

Continuation of application Serial No. 514,374, December 15, 1943. This application April 26, 1948, Serial No. 23,280

8 Claims. (Cl. 64—29)

My invention relates to a tool for rotating a rotatable device with a torque. The invention is particularly advantageous when used to produce desired interengagement of threaded elements at certain desired and limited thread pressures. Hence, my invention is readily adaptable to embodiment in a torque wrench tool and particularly an automatic releasable and adjustable torque wrench which, although spring actuated, will give long and reliable service.

Spring-actuated torque applying tools and automatic releasable torque wrenches, heretofore available and known to the public, commonly have their actuating springs maintained under elastic distortion at all times. Hence, in the period of normal use of a prior art tool, the actuating spring thereof is maintained in distortion or under strain of a varying degree from the time the tool is first fabricated. This extended period of spring strain causes rapid crystallization of the material of the spring, with resultant spring set or deterioration of reliable spring reaction and fore-shortened valuable tool use. It is apparent that the maintenance of the actuating spring under continuous distortion is markedly disadvantageous.

The usual arrangement by which adjustments of such prior art tools and wrenches are effected is accomplished by varying the degree of distortion of the already distorted actuating spring, preparatory to application of the tool to the work to be performed. Thus, adjustments are required to be made against the resistance of the actuating spring. Oftimes, this requires the adjustor to utilize a force to overcome the force exerted by the spring which prevents the marking of fine and close tolerance adjustments required in certain types of work.

To eliminate the serious defects of the prior art constructions, my invention has for an object to provide a tool in which the actuating spring may be maintained elastically at constant stress or at rest at all times, except during an instance of actual tool work. A still further object of my invention is to provide an adjustable spring actuated torque applying tool in which the adjustment thereof is effected, while the actuating spring remains elastically at constant and zero stress. My invention also has for another object to provide means for adjusting the reaction of the tool to various torque applications, which adjusting means is physically and operationally independent of the actuating spring.

The invention has for a still further object to provide torque applying tool actuated by an elongated torque member of elastic material, by reason of which a light weight, relatively short tool may be constructed of adjustable variations, having a predeterminable range of resistance in an exceedingly widely diversified series of resistance ranges. My invention further provides means to select any of the ranges of resistances of the series of ranges in connection with which the tool may be used.

Hence, I provide a tool for rotating a rotatable device and a means coacting therewith that will elastically respond in exactly the same manner to relatively very high rotative pressures or to relatively very low rotative pressures.

The invention may be contained in structures of different forms. The preferred form of structure is shown in the accompanying drawings, it being understood, however, that variations of its form may be made, and the uses to which the invention may be put may greatly vary, without departing from the spirit of the invention as claimed in the claims forming a part of this description.

In the drawings, Fig. 1 is a top plan view of the tool selected to illustrate an embodiment of my invention. Fig. 2 is a side view of the tool, taken at a 90° angle to the view illustrated in Fig. 1. Fig. 3 is a view of a section taken on the plane of the line 3—3 indicated in Fig. 1. Fig. 4 is a view of a section taken on the plane of the line 4—4 indicated in Fig. 3. Fig. 5 is an enlarged view of a section taken on the plane of the line 5—5 indicated in Fig. 2. Fig. 6 is a view of a section taken on the plane of line 6—6 indicated in Fig. 5. Figs. 7 to 10 diagrammatically illustrate various operating positions of tool parts, shown in solid lines, relative to outer parts, shown in dotted lines. Figs. 7 and 9 illustrate the parts at rest in different adjusted non-working position. Fig. 8 shows the relative positions of the parts, at release, after having worked from the rest position shown in Fig. 7. Fig. 10 illustrates the relative positions of the parts at release after having worked from the rest positions as shown in Fig. 9. Fig. 11 illustrates, diagrammatically enlarged, the relative positions of the parts, as shown in Fig. 7, and the paths of movement of certain points thereof to produce various actuating forces.

The particular tool selected for purposes of illustrating an embodiment of my invention has a convenient head or housing in or upon which the various parts of the tool are supported. Means for supporting and rotating the housing is provided, which, in the particular manually operative tool shown in the drawings, is embodied in a hollow or tubular handle connected to the housing.

The housing supports a pair of drivers or members, bearing means being individually provided on the housing for supporting each of said members for movement relative to the housing. Preferably, one of said bearing means is adapted to support one member for reciprocative non-rotative movement relative to the housing and the other of said bearing means is adapted to support the second member for rotative movement relative to the housing. Also, preferably, the latter mentioned bearing means is embodied in a unit which is separable from and adjustably mounted on the housing for reasons that will be later made apparent.

One of the members, preferably the rotatively supported member, has a coupler means thereon adapted to operatively connect a rotatable device to be rotated by the tool to the member. As the housing is rotated by the handle to rotate the rotatable device, the resistance to rotation exerted by the rotatable device tends to cause the member operatively connected thereto to lag and in effect move or rotate relative to the housing and the other member. The members have mutually engageable cam surfaces with cam projections extending therefrom of measurable effective throw which are adapted upon the relative movement of the lagging member, for example, to slidably contact and cause movement of the other member.

In order that there will be a limit to such movements of the members, my tool is provided with means including a resilient element, preferably embodied in an elongated torque bar, which is operatively connected to one of the members and tends to yieldably constrain said member to a certain position within the housing. Thus, when the relative movement of one member tends to cause, through said cam surfaces, movement of the constrained member from its said certain position, the continued movement of the one member relative to the housing is resisted and the housing and rotatable device tend to rotate together, provided the resistance to rotation of the rotatable device is of a lesser order than the resistance of the constraining means. If, however, the resistance to rotation exerted by the rotatable device is of a greater magnitude than the resistance of the constraining means, the continued rotation of the housing will produce movement of the members relative to the housing with no rotative effect on the rotatable device. The continued relative movement of the members under this last condition terminates when the member's cam surfaces disengage.

One of the important features of the embodiment of my invention illustrated in the drawings resides in the provision whereby the members are supported during the non-working period of the cam surfaces, best shown diagrammatically in Figs. 7 and 9 of the accompanying drawing. This relation is obtained by supporting one member, through the medium of said constraining means, in a certain position spaced from the bearing means of the other member. The spatial relation is such that the members, when the projecting portions of the cam surfaces thereof are disengaged, are in a non-pressing relation to each other and, thus, communicate no pressure to each other or the resilient element to stress the same.

By reason of the described relation, the resilient element may be at zero stress during the non-working period.

Referring now, specifically, to the drawings for a more detailed explanation, it will be noted that a head or housing 2 is shown provided with means for rotating the same, embodied in a hollow tubular handle 1. The handle has a conveniently disposed hand grip 5 located at the free end thereof by which the tool may be manipulated. The other end of the handle 1 extends into the housing 2 through an opening 15 where it is suitably locked, as by a set screw 17.

Within the housing 2 are located two drivers or members 21 and 22. The member 21 has bearing surfaces 23 which cooperate with bearing means formed by the surfaces 20 of the walls of the housing to support the member for movement relative to the housing reciprocably along an axis, as best shown in Figs. 5 and 6 of the accompanying drawings. Said bearing means is adapted to prevent the member 21 from rotating relative to the housing and thus the member 21 rotates with the housing, when the housing is rotated by the handle 1. The reciprocable movement of the member 21 in one direction is limited by an annular shoulder 19 formed within the housing 2. (See Figure 8.)

The member 22 has an annular conical bearing surface 31 which cooperates with bearing means on said housing provided by an annular unit 27 having a conical surface 28 to support the member 22 for rotative movements relative to the housing 2. The unit 27, conveniently referable to as a ring, is provided with axially extending fingers 35 which may be disposed in slots 36 formed in opposite sides of the housing 2 in diametrically opposite relation to each other. When the fingers 35 are disposed in the slots 36, the ring unit 27 may be adjusted axially relative to the housing but is prevented from moving rotatively with respect thereto.

In order to lock the ring unit 27 in any desired position on the housing 2, a collar 37 having a conical lip 38 adapted to contain or nest with the ring unit 27 is threadably mounted on the housing 2. Thus, by moving the collar 37 along the thread engagement thereof with the housing 2, the position of the ring unit bearing means 27 and the member 22 supported thereby may be adjusted with reference to the housing and parts mounted therein. It is desirable to also provide a lock nut 41 threadably engaging the exterior surface of the ring unit 27 and adapted to engage the lip 38 of the collar 37 to secure the same against accidental loosening with attending undesired movement of the ring unit 27.

In order to operatively connect a rotatable device to be rotated to the tool, the member 22 has a coupler means embodied in the integral extension 4 of the member 22. The extension 4 extends outwardly from the housing 2 through the space within the perimeter of said ring unit 27. Thus, when a rotatable device to be rotated is connected to said coupler extension 4 and the housing 2 is rotated by the handle 1 about the axis of rotation of said device, the member 22 tends to respond directly to the tendency or lack of the same of the rotatable device to rotate with the housing 2.

So that the rotation of the housing 2 will produce a more positive driving effect on the rotatable device connected to the member 22, the members 21 and 22 have mutually facing and engageable cam surfaces adapted to slidably contact upon rotation of the member 22 relative to the housing or upon axial movement of the member 21 relative to the housing. In the particular embodiment shown in the drawings, said cam surfaces of each member are similar and include a plurality of spaced castellated projections or teeth 40 having inclined flank surfaces 39 joining the high point flat crowns of the teeth 40 with the low point lands 24 extending between adjacent flank surfaces 39 of adjacent teeth.

Thus, when the members 21 and 22 are supported in positions, such as those shown in Figs. 7 and 9 of the accompanying drawings, and the housing 2 is rotated relative to a rotatable device connected to the member 22 by the coupler means 4, the flank surfaces 39 of each member's cam surfaces are moved into sliding contact, resisting further rotation of the member 22 relative to the housing 2 to a degree dependent on the resistance of the member 21 to axial movement in the housing produced by the sliding contact of said flank surfaces 39.

The resistance to axial movement of the member 21 in the embodiment illustrated in the drawings is made substantial by the provision of a means for yieldably constraining said member 21 at a certain position within the housing. In the constraining means and in the relation of the elements and parts thereof to each member about to be described resides the features by which a construction embodying my invention largely differs from the constructions of the prior art.

Said constraining means includes a resilient element. The resilient element is embodied, preferably, in an elongated straight torque bar 7 of elastic material such as a properly tempered metal. The bar 7 is of any desired length and thickness according to the range of stress to which it is contemplated the bar may be subjected. Conveniently, the bar 7 may be largely housed within the handle 1 and be retained against endwise and transverse movements relative to the handle by bearing means within the handle. Said bearing means is preferably incorporated in bearing members 8 and 9. The exterior lateral surfaces of the members 8 and 9 fit and engage with the interior lateral surfaces of the hollow handle 1 to maintain the sleeve members in alignedly spaced concentricity within the handle. Preferably, the bearing member 9 has a polygonal socket, formed concentric with the axis of the handle, for receiving the likewise polygonal end of the torque bar 7 in fitting relation, as shown in Figs. 5 and 6 of the accompanying drawings. Thus, the end of the bar 7 within the socket of the member 9 is operatively connected so that a rotation of the member 9 about the axis of the handle 1 tends to produce corresponding rotation of the bar end and vice versa.

The bearing member 8 is of a sleeve-like form having an opening extending therethrough concentric with the axis of the handle 1 and preferably polygonal in cross-section. The other end of the bar 7 is likewise preferably polygonal in section and is adapted to extend through said opening in axially slidable fitting relation as shown in Fig. 3 of the accompanying drawing. Thus, the bar 7 is held by the members 8 and 9 against bending deflection from its straight line of extension.

In order that the bar may be stressed and exert a yielding resistance for utilization in the tool of my invention, there is provided means on the handle 1 for retaining the member 8 against rotation relative to the handle. As shown, said means includes splines 45 extending radially from the exterior surface of the member 8 and adapted to fit and ride between slot edges 10 formed in the handle 1, as shown in Figs. 3 and 4 of the accompanying drawings. Thus, the end of the bar 7 supported by the member 8 is held against rotation relative to the handle 1 while the end of the bar supported by the member 9 is free to rotate. The yieldable resistance which the torque bar 7 is capable of exerting is developed by the stressing or twisting of the portions of the bar between the bearing members 8 and 9 in the relative rotation of the opposite ends thereof.

The portions of the bar 7 subject to stress twisting may be shortened or lengthened in order to vary the range of resistance over which the torque bar will be responsive. Consequently, means is provided to axially shift the bearing member 8 in its spatial relation to the member 9. Said means is preferably embodied in a threaded plug 47 which threadably engages the free end of the member 8 and is rotatably mounted in the grip sleeve 5, as shown in Figs. 3 and 4 of the accompanying drawings. By rotation of the plug 47, the member 8 may be shifted to any desired spatial relation to the member 9 to vary the length of the intermediate twistable portions of the torque bar 7. Access may be had to the plug through an opening in the grip sleeve 5 which preferably is formed separable from the handle 1 to allow further access to within the handle. The grip sleeve 5 may be fixed to the handle 1, as by a suitable set screw 42. Thus, the range of resistance of the torque bar 7 may be adjusted between any of a widely diversified series of ranges according to the intended general purpose of the tool. Ordinarily, the setting of the member 8 relative to the member 9 is a factory setting. Such setting allows for adjustments which are compensatory to temper differences in the torque bars in a program of mass production of tools of this character that ordinarily would require expensive re-machining of the other parts of the tool to correct.

In order that the torque bar will be exposed to the forces produced in the movement of the driver members 21 and 22, the bearing member 9 is operatively connected to a part adapted to be engaged by one of the members in movement of the member relative to the housing 2. Said part is preferably embodied in an integral axial extending part 11 of the member 9. The part 11 extends through the opening 15 to a certain position within the housing at which it is constrained by the torque bar 7. The lateral surfaces of the part 11 bear in sliding engagement on bearing surfaces supplied by the inner lateral walls of the end of the handle 1 extending, as described, into the housing. The relation of the part 11 just described is best shown in Figs. 5 and 6 of the accompanying drawings. Thus, the part 11 is supported for reciprocably rotative or rocking movements relative to the housing 2 to and from a certain position to which it is constrained by the torque bar 7.

The contour of the part 11 is relieved by cutting away to form a diametric plane surface 12 disposed in inclined relation to the line of axial movement for which the member 21 is supported by its said bearings. The angle of inclination is one less than 90° and preferably, for best results, of the approximate order of 45°. Thus, as will be more apparent hereinafter, the movement of the member 21 will produce contact with part 11 only over desired surface areas, and the movements of the part 11 and member will otherwise be independent of each other.

One edge of the plane surface 12 along the line of juncture of the plane surface with the lateral surface of the part 11 is machined to form a rounded cam-like surface 50. The cam surface 50 is adapted to slidably contact with the end part-contacting surface of the member 21 when the member 21 is moved relative to the housing from a certain position therein at which it is constrained by a means, including the part 11 and the torque bar 7 connected thereto. Said end part-contacting surface is not numbered in the drawings but is shown in Figs. 7, 9, and 10 thereof. The said part-contacting surface of the member, as shown, is spaced from the cam surfaces, including the teeth 40 previously described, of the member 21.

If desired, a light spring 32 may bear against the member 21 with sufficient force to prevent the member 21 from falling away from contact with the part 11 in the manipulation of the tool preliminary to working. Preferably, the spring 32 extends between the members 21 and 22 utilizing the member 22 as a convenient bearing point for operation on the member 21. The spring 32 is of such lightness that the force exerted thereby on the member 21 has practically no effect to stress the bar 7.

Thus, it will be seen that the part 11 is supported by its bearing means for rocking movement relative to the housing 2, to and from a certain fixed position at which it is constrained by the torque bar 7. Such position, when the members are in a non-working relation, as shown in Figs. 7 and 9 of the accompanying drawings, is one, as will be observed, in which the part 11, particularly its cam surface 50, is spaced from bearing surface 31 a distance equal to or greater than the distance between bearing surface 28 of member 22 and the end part contacting surface of member 21 when the members are located so that the low point land 24 of the member 21 is in contact with the high point of the cam surface, i. e. crown of the teeth 40, of the member 22.

The position of the part 11 to which it is constrained by the torque bar determines, with the spring 32, the position of the member 21 in a non-working relation. This position of the member 21 is aptly to be described as a certain position spaced from the conical bearing surface 31 of the bearing ring unit 27. In such position the high point 40 of the cam surface of the member 21 is spaced from the bearing surface 31 a distance equal to or greater than that between the cam surface low point 24 of the member 22 and the bearing surface 28 thereof.

Thus, when the member 22 is rotatively moved relative to the housing 2, preliminary to engagement of the surfaces 39 of its teeth 40 with the like surfaces 39 of the teeth 40 of the member 21, the member 22 is maintained in adjacent non-pressing relation with the member 21. There is no pressure transmitted between the members or to the part 11 and, thus, no stress transmitted to the torque bar 7. However, when the member 22 is moved, effecting contact and sliding engagement of the surfaces 39 of both members, to register the teeth 40 of both members, the member 21 through its end part-contacting surface presses against surface 50 of the part 11 and causes movement thereof against the resistance of the torque bar 7. As shown in Fig. 11, the sequential positions of the end part-contacting surface of the member 21 in moving from the position shown in Fig. 7 to that shown in Fig. 8 of the drawings are shown by the dotted lines 47, and the various points of shifting contact thereof with the cam surface 50 are indicated by the curved dotted lines 48.

The degree of movement of the members 21 and part 11 and the stressing of the torque bar is determined by the spatial relation of the bearing surface 28 for the member 22 to the surface 50 of the part 11 established, preliminary to working operation, by the adjusted position of the ring unit 27, previously described. Two such adjustments are shown in Figs. 7 and 9 of the accompanying drawings in neither of which the members 21 and 22 are in pressure relation.

The adjustment shown in Fig. 7 is such that, on movement of the member 22, there will be immediate engagement of surfaces 39 with a much greater proportional movement of the member 21 and the part 11 to cause greater stressing of the torque bar 7 than that producible from the adjustment shown in Fig. 9. Thus, by adjusting the ring unit 27 to increase the space between the members or the relation with the part 11, the effective resistance of the torque bar is reduced.

The stressing of the torque bar 7, as described, produces reactive pressures transmitted through the part 11 and member 21 to the member 22. These reactive pressures cause increased bearing between the conical surface 31 of the member 22 and the conical surface 28 of the member 22 to rotate relative to the housing. Thus, a rotatable device which may be connected to the member 22 will be correspondingly rotated as the housing 2 is rotated by the handle 1, as long as the resistance to rotation exerted by the rotatable device is of lesser order than the described reactive pressure and bearing seizure produced by the torque bar 7. When, however, the resistance of the rotatable device increases to a magnitude in excess of such bearing pressure effect produced by the torque bar 7, the continued rotation of the housing 2, relative to the rotatable device, causes the member's surfaces 39 to slidably move over each other to disengagement with resulting engagement of the opposite flat crowns of the teeth 40. The reactive pressure effect produced between the crown surfaces and the conical bearing surfaces 31 and 28, at this stage, while not sufficient to further drive the member 22 with the housing, is sufficient to produce a frictional brake effect between the crown and conical surfaces resistant to the relative movement of the housing 2 and member 22. This brake action avoids the disturbance of the operator as might otherwise occur upon sudden release of the member 22 from rotation with the housing 2 upon disengagement of the surfaces 39 at the moment the operator is exerting a high pressure on the handle 1.

Further relative movement of the members causes mutual disengagement of the crown surfaces of the teeth and a return of the members to a relation as shown to the starting position where the members are again located in non-pressing relation.

It will be observed that a tool embodying my invention by reason of the spaced relation of the member 22 and its bearing with reference to the positions of part 11 and member 21 enables maintenance of the torque bar 7 at constant or zero stress during all non-working periods of the tool. Further, it will be apparent that adjustments of the torque bar's reaction to movements of the members may be effected without increasing the stress of the torque bar, by adjustment of the ring unit 27 to vary the spatial relation of the member 22 and its bearing to the member 21 and part 11.

This application claims an invention disclosed in my co-pending application for United States Letters Patent, Serial No. 676,454, filed June 13, 1946, for a Power Transmission and is a continuation of my co-pending application for United States Letters Patent, Serial No. 514,374, filed December 15, 1943, for an Automatic Pressure Release Tool, and since abandoned.

I claim:

1. In a torque wrench having a rotatable housing, a chamber in the housing, a pair of members in abutting relation in the chamber, one of said members being supported for non-rotative lineal movement in the chamber and the other member being supported for rotative and non-lineal movement in the chamber, the abutting portions of the members being provided with interfitting cam shaped teeth whereby rotation of the rotatable member will cause lineal movement of the non-rotative member, a torque bar non-rotatably secured in the housing at one end and in contacting and non-biasing engagement with the non-rotative member at the other end to resist movement of said non-rotative member when cammed toward the bar by the cam teeth upon the occurrence of a preselected torque and means connected to said bar and housing for adjusting the effective length of the bar to thereby predetermine its torsional flexibility.

2. In the torque wrench described in claim 1 in which said rotatable housing has an elongated handle portion, the handle portion having an elongated non-round chamber therein and the torque bar being in the handle portion chamber.

3. In the torque wrench described in claim 2 in which the torque bar has a non-round surface and the means for adjusting the effective length of the bar includes a sleeve with a non-round exterior surface and a non-round interior surface, the sleeve exterior surface being in sliding engagement with the non-round handle portion chamber and the sleeve interior surface being in sliding engagement with the non-round torque bar surface, said sleeve being axially shiftable along the bar to positions at different distances from the bar end in engagement with said non-rotative member to thereby vary effective length and torsional flexibility of said bar.

4. In the torque wrench described in claim 3 having in addition a threaded part being supported for rotatable movement in the handle portion and being in engagement with said sleeve whereby rotation of said threaded part causes the sleeve to move in said handle portion chamber along said bar.

5. In the torque wrench described in claim 1 having in addition a part being supported for rotative movement in the housing about an axis in alignment with the lineal axis of said torque bar and being connected to said torque bar and providing the end thereof in contacting engagement with said non-rotative member.

6. In the torque wrench described in claim 5 in which said part has a half-cylindrical bearing surface in sliding engagement with said housing and a plane surface diameteric to said half-cylindrical bearing surface and being in contacting engagement with said non-rotative member at a point on said plane surface at one side of the axis of rotative movement of said part whereby lineal movement of said non-rotative member causes rotation of said part and twisting of said bar.

7. In the torque wrench described in claim 6 in which said part plane surface is inclined to the line of lineal movement of said non-rotative member.

8. In an automatic pressure release wrench having a connected handle and a chambered housing, a pair of interengaging movable members located in axial alignment within the housing; a ring having an annular surface, one of the movable members having an annular surface in bearing engagemement with the ring annular surface to support said member for rotatable movements relative to the housing; the housing having a bearing surface for supporting the other member for axial non-rotative movement relative to the housing and the rotatably supported member; the rotatably supported member being connectable with a rotative device; the members having engagable surfaces rotatively disengageable by axial separation of the members; a spring located intermediate the members for separating the members axially; an elastic element; means operatively connecting the elastic element and the axially movable member and cooperating with said elastic element to resist relative axial movements of the members to disengagement; and means for adjustably securing the ring to the housing to vary the pressure of the elastic member required to produce disengagement of the said engageable surfaces.

References Cited in the file of this patent

UNITED STATES PATENTS

| Number | Name | Date |
|---|---|---|
| 1,237,932 | Marlin | Aug. 21, 1917 |
| 2,409,545 | Cornwell | Oct. 15, 1946 |
| 2,441,038 | Siesel | May 4, 1948 |
| 2,595,274 | Latimer | May 6, 1952 |

FOREIGN PATENTS

| Number | Country | Date |
|---|---|---|
| 703,769 | Germany | 1941 |
| 520,963 | Great Britain | 1940 |